March 29, 1949.  V. STARK  2,465,666
METHOD AND APPARATUS FOR
PRODUCING HEATING GAS
Filed March 15, 1946  2 Sheets-Sheet 2

INVENTOR.
VIRGIL STARK
BY
Emery Holcomb Blair
ATTORNEYS

Patented Mar. 29, 1949

2,465,666

UNITED STATES PATENT OFFICE 2,465,666

METHOD AND APPARATUS FOR PRODUCING HEATING GAS

Virgil Stark, New York, N. Y.

Application March 15, 1946, Serial No. 654,769

21 Claims. (Cl. 48—214)

This invention relates to the production of low cost heating gas from water and liquid hydrocarbons, particularly heavy fuel oils, by means of radiant heat, and the invention comprises both an improved process and apparatus for performing it.

The invention aims to utilize low grade oil, including waste crank case oil and refinery residua, for producing combustible gas having the requisite calorific value and freedom from objectionable impurities for domestic heating and manufacturing processes at a less cost than such gas has heretofore been made by processes utilizing coal as the source of heat.

Many factors effect the composition of the gas mixture produced in apparatus in use at the present time, and my invention enables the composition to be maintained substantially constant with respect to the desired heating value and specific gravity and insures freedom from ingredients that clog conduits and burners, notwithstanding variations in the character and amount of oil supplied and rate of production.

The gas produced by my invention is a mixture mostly of volatiles, methane, hydrogen and carbon monoxide. The proportion of these elements in the gas, the heat content per cubic foot, and the gravity of the gas produced depend on the following factors: the temperature at which the mixture is submitted; the length of treatment and way of contact of the gas with solids, retort walls and catalytic materials at high temperature; the proportion of hydrocarbons and water in the mixture; and the physical form of the premixture.

It is my object to maintain control of these factors in order to obtain a gas of a constant composition, heat content and gravity, regardless of the variation in output of the gas machine.

Other objects of the invention are to control the process throughout to prevent loss of heat and maintain a high efficiency of operation as hereinafter explained.

Figure 1:
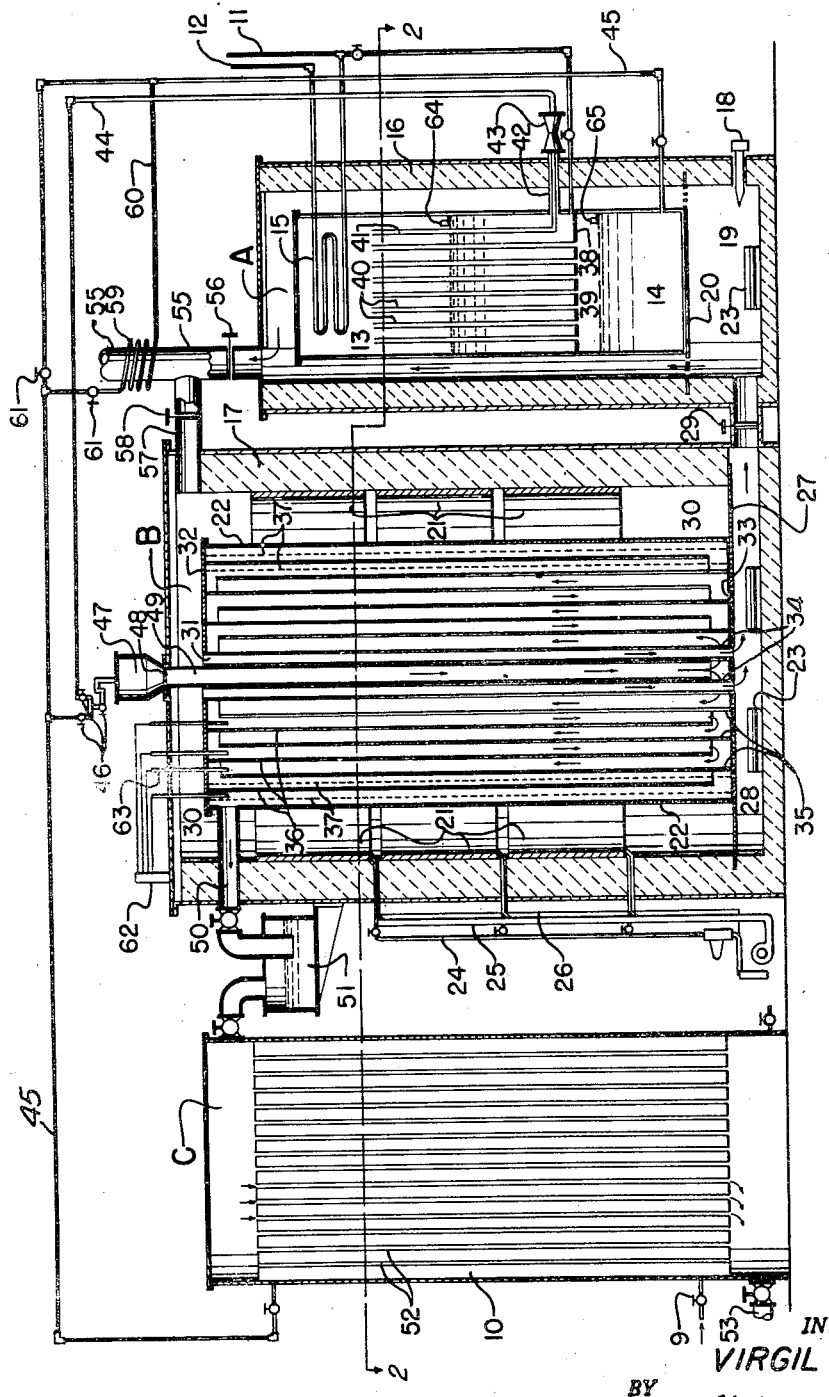
Figure 2:
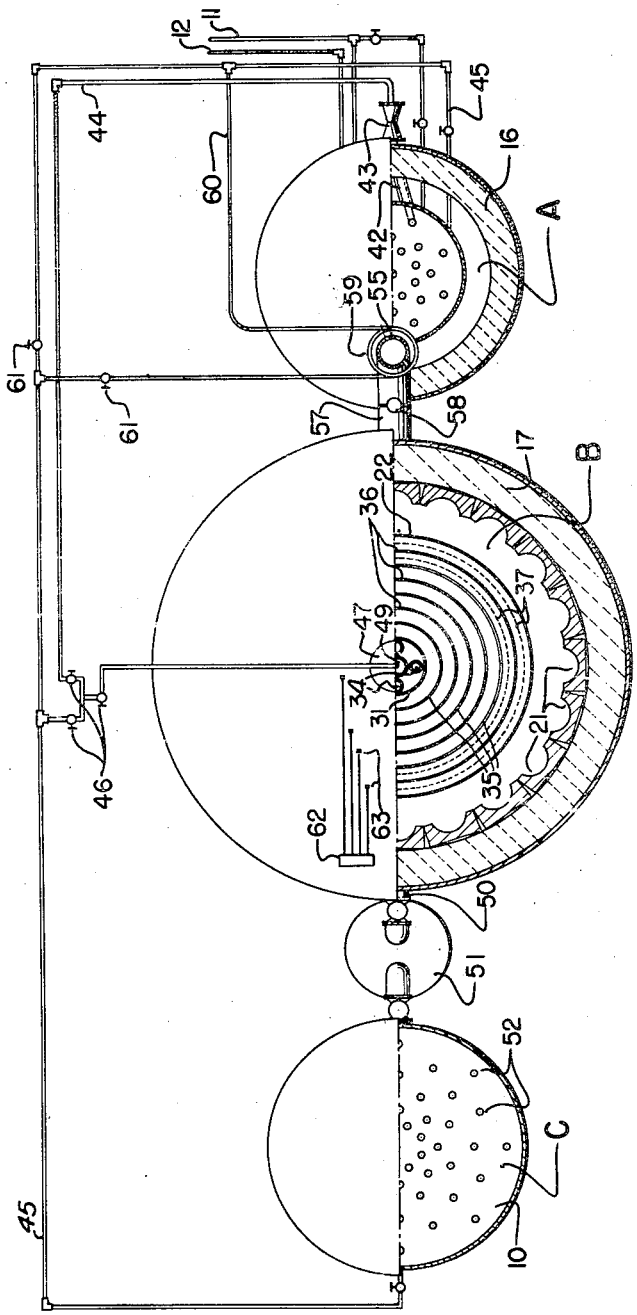

In the drawings, illustrating a preferred form of apparatus for practicing the invention, wherein the same reference characters designate the same parts in the several views, Fig. 1 is a vertical midsection of a type of apparatus adapted for producing gas from heavy oil, and Fig. 2 is a half plan view and half cross section of the same on the line 2—2 in Fig. 1.

The apparatus illustrated comprises an evaporator chamber A, a gas producer chamber B, both enclosed in fire brick walls and provided with suitable burners and control devices, and a combined condenser and water heater C, together with the necessary pipes, pumps and scrubbing apparatus for handling the water, oil and gaseous products entering into the process. Water enters the system through the pipe 9 at the lower end of the water space 10 in the heat exchanger C, and oil enters the system through one or the other or both of the pipes 11, 12 leading to the bottom of the upper or evaporator space 13 of a pressure vessel 14 in the chamber A, a coil 15 being provided in the top of the evaporator vessel for preheating the oil entering through the supply pipe 12.

Both the evaporator chamber A and gas producer chamber B are cylindrical with their side walls lined with brick or other refractory material 16, 17 and both are provided with gas or liquid fuel burners for heating them. The evaporator A is fitted with a gun type burner 18 in the combustion space 19 beneath the perforated plate 20 which supports the evaporator 14, which burner is used only in starting up the system.

The gas producer chamber is fitted with a large number of radiant heat burners 21 arranged with their refractory reflection elements in circular tiers completely surrounding the tubular gas generator 22, and a smaller number of similar burners 23 may be disposed on the floor of the chambers A and B for aid in controlling the temperature of the apparatus at different stages of operation. Suitable fuel and air supply pipes 24, 25 and pilot burner fuel lines 26, with the necessary control devices are provided in accordance with well understood practice in the art. The gas produced in the apparatus is suitable for operating the burners 21 and 23.

The gas producer chamber B is divided into upper and lower parts by a steel partition 27 near its bottom on which the generator 22 is supported, the lower part 28 being in communication with the chamber 19 in the bottom of the evaporator chamber A through a passage controlled by a valve 29. The upper part 30 of the gas producer chamber serves as a combustion chamber and its top region is connected with the lower part 28 through a tubular flue 31 extending from the top wall 32 of the generator 22 nearly to the bottom wall 33. The flue 31 has a closed bottom provided with openings through which it is connected by pipes 34 discharging into the space 28. Secured to the top and bottom walls 32, 33 and supported thereby are two series of concentrically disposed stainless steel tubes or cylinders 35, 36, the tubes of each series being of decreasing diameter arranged in alternation, each one within the next larger, one series being connected to and supported from the top wall and the other series being connected to and supported from the bottom wall, permitting passage of vapor between them from bottom to top and back again as indicated by the arrows in Fig. 1. The length of travel for the gases in the labyrinth or chamber thus provided may be from five to ten or more times the length of the vaporizer pipe 49 and from one hundred to two hundred or more times its volume.

There may be arranged in the outer circular spaces between these tubes screens or gratings 37 of nickel wire or other catalytic material to promote the cracking of the oil and the admixture of cracked oil products with the oxygen and hydrogen gases resulting from the very high heating of the water vapor present to produce a gaseous fuel of the uniform quality desired.

The pressure evaporator 14 is divided into upper and lower chambers by means of a perforated diaphragm 38 which supports a number of vertical pipes 40 connecting with each perforation and extending to near the top of the upper chamber 13 to provide free communication between the lower chamber 39 and the upper portion of the upper chamber for steam produced in the lower chamber. A vapor discharge pipe 41 leads from the upper part of the upper chamber 13 down through the oil in the lower part thereof to near the bottom diaphragm 38 and through a larger liquid outlet pipe 42, both of which pipes extend through the side wall of the vessel 14 and chamber A to a mixer and ejector 43 on the outside. Under normal operating conditions, the flow of steam through the pipe 41 entrains a part of the liquid oil in the pipe 42 and carries it along in the form of small drops or oily vapor through the outlet pipe 44 to the gas producer, where additional water is added from the supply pipe 45 leading from the pre-heater C. Suitable mixing valves 46 are provided for controlling the proportions of steam and oil suspension and water and regulating the pressure at which the mixture is discharged into the eddy forming contact material in the mixing chamber 47 from which the generator is supplied with fuel for producing the desired gaseous products. This contact material may include small pieces of metal, lumps of coal or ore, and mineral wool or earthern ware chips. A perforated plate 48 separates the contact material chamber from the vaporizer pipe or cylinder 49 centrally disposed in the gas producer chamber B, and through the perforations in this plate the fuel mixture is sprayed into the cylinder 49, impinging on its heated walls and expanding from this tube into the concentric spaces between the nested tubes 35, 36.

From the outermost concentric section of the gas generator 22, a gas take-off pipe 50 leads through a water seal 51 to the condenser C of usual construction where it passes through a number of heat exchanger tubes 52 to the gas outlet 53 whence it passes to the usual scrubbers and purifiers on the way to the storage tanks and distributor mains of the service system or other use for which it is adapted.

The hot furnace gases produced in the burners 21 circulate around the exterior of the gas generator 22 and over its top, passing down through the tube 31 and into the space 28 beneath the generator and out through the valve 29 into the combustion chamber 19 in the lower part of the evaporator, whence they flow through the perforated plate 20 and around the exaporator 14 into the smoke pipe 55. A valve 56 is provided for cutting off the smoke pipe from the evaporator if desired; and a direct flue 57 is also provided leading from the top of the combustion space 30 in the gas producer B into the smoke pipe. A valve 58 controls the escape of furnace gases from the producer directly into the smoke pipe, and this valve is closed in the normal operation of the system.

Around the smoke pipe 55, a coil of pipe 59 is placed for additionally preheating the water entering the system through the pipe 60, if desired. Suitable valves 61 are provided for controlling the volume of water passing through the coil 59. The generator is equipped with pyrometers 62 and gas sampling tubes 63 at convenient positions for determining the condition of the contents of the passages within the walls.

The admission of oil and water to the evaporator A is controlled by float operated electrical contact members 64, 65 located in the oil space and water space, respectively, as is well known in this art.

The process contemplates submitting heavy hydrocarbon liquid fuel to controlled heat in the presence of steam, the temperature increasing throughout the process but the gas pressure remaining substantially constant in the generator, thereby cracking the heavier hydrocarbons, the amount of superheat in the steam increasing until in the presence of the catalytic material it decomposes into hydrogen and oxygen and combines with the cracked hydrocarbons to form carbon monoxide and light hydrocarbons within the permanent gas group. Some hydrogen gas is produced and some carbon is deposited on the walls of the generator, but this deposited carbon can readily be burned off by cutting off the flow of fuel periodically and passing steam only through the heated generator.

For example, assume that the object is to produce gas of 530 B. t. u. out of a proper mixture of heavy oil (refinery residuum A. P. L. 180) and water. The heated mixture of both heavy oil and water is introduced into the gas machine. The temperature is regulated so that the first central cylinder has 650° F., being heated both by radiant heat and by the flue gas. The saturated hydrocarbons will begin to distill and produce mostly hydrocarbons of $C_nH_{2n}$ series olefine, naphthalene, aromatic series) and the water will be in a superheated vapor form. The heat content of the hydrocarbon vapor in the first column will be about 1700 B. t. u./c. f.

The gas and vapor pass between the next following cylinder and are gradually submitted to higher and higher constant temperatures as each cylinder gets a predetermined higher temperature through radiant heat, depending on its proximity to the burners.

With the increase in temperature of successive layers of the fuel mixture, the hydrocarbons of the $C_nH_{2n}$ series will begin to crack and produce methane ($CH_4$), ethylene ($C_2H_4$), hydrogen ($H_2$) etc. Above 1200° F. butane, propane and ethane are decomposed. For instance, ethane, decomposes into ethylene and hydrogen ($C_2H_6=C_2H_4$ plus $H_2$), ethane will also decompose into methane, carbon and hydrogen ($C_2H_6=CH_4$ plus C plus $H_2$). As methane and hydrogen have less heat content per cubic foot than ethane, the result is that the gas has less B. t. u./c. f. and more volume is produced.

As higher temperatures are encountered not only is there a thermal decomposition of the hydrocarbons, but also reactions are taking place of the hydrocarbons with atomized steam to form carbon monoxide (CO) and hydrogen; for instance, methane ($CH_4$ plus $H_2O = CO$ plus $3H_2$). If the temperature of the last outside stage is brought up to approximately 1600° F. the gas produced by the machine will have approximately 530 B. t. u./c. f. and will be composed mostly of H, CO, $CH_4$, and some olefines.

The decomposition of the hydrocarbons involves surface phenomena taking place between the gas and the solid surface of the hot cylinders. The distance between the cylinders and the time of treatment, that is the number of cylinders and their size, is therefore of importance, as thereby the apparatus can be adapted to the character of the oil and quality of gas desired. There will not only be an upward mass movement of the gas along the hot cylinder's surface, but also a down current within the gas sheet of the inner part of the gas less warm than the outside parts. The convection currents in the gas sheets will delay the mass movement and increase the time of reaction. Not all cylinders have to be at the same distance from one another, but the distance can vary in order to avoid certain temperatures and increase the time of treatment at other temperatures as the temperature of the cylinder depends upon the distance from the radiant wall.

The effect of the catalyst, such as a nickel screen in form of a cylinder of wire mesh (8 mesh 0.03 inch) inserted between the stainless steel cylinders, is to increase the production of H and CO out of hydrocarbons and steam. Such catalysts can, it is found, be inserted only in the last cylinder sheets where such reactions take place at high predetermined temperatures. Other catalysts such as cobalt, alumina, magnesium or their combination could be used.

Below 1400° F. carbon deposits may be troublesome but can be entirely eliminated by steaming the machine with or without the help of higher temperatures obtained by increasing the heat input in the radiant burners 21, 23 in the gas producer chamber B.

If a gas of 1000 B. t. u./c. f. is desired, the temperature of the cylinders can be brought down to the desired ones by regulating the radiant heat burners accordingly. At lower temperatures more high volatiles of higher B. t. u./c. f. and methane will be available in the gas produced and less H and CO resulting from their decomposition.

I have found that the cylinders or tubes, respectively, can be brought by the radiant heat to an uniform temperature all around their surface, the temperature being different for each cylinder and only depending upon the distance of the cylinder from the radiant wall, increasing as the cylinder is nearer to the wall; and this uniform temperature for each cylinder can be increased or decreased at will by changing the input of heat in the radiant burners, thereby subjecting the gas in each successive cylindrical space to a predetermined temperature increase and obtaining in this way uniformity in the gas produced.

It is evident that by choosing the temperature, the time of treatment (that is the number, size and distance of cylinders), and the proportion of input mixtures with water, it will be possible to obtain a constant gas of desired B. t. u./c. f. (e. g. either 1500 or 1000 or 550 B. t. u./c. f.) of corresponding specific gravity (higher the B. t. u./c. f., higher the gravity).

By this process, the machine can be operated to produce such desired gas from a variety of fuels such as heavy fuel oils, refinery residua, crude oils, gas oils, used lubricating oils, propane, butane, and also vegetable oils, such as cocoanut oil, palm oil, and cotton seed oil and animal greases.

Advantages of the invention are that the starting up period is short and that either liquid or gaseous fuel may be used for starting and that automatic control devices of known types may be used for starting and stopping the operations of the machine.

The process may also be carried out in existing coal water gas installations by removing the central brick work from the carburetor chamber and substituting the pre-mixing and evaporating unit, and by installing the generator unit on the grill of the generator furnace, surrounding it with radiant heaters, utilizing the original wash box, condenser and purifiers.

The efficiency of the process utilizing radiant heat is very high. The thermal efficiency is further increased by: the flue gas heats the incoming mixture; the flue gas heats the water going to the pre-mixer; the heat obtained from the gas cooled in the condenser is conducted by the water to the pre-mixer after passing through the coils; the flue gas also heats the water of the pre-mixer; and the water vapor from the pre-mixer heats the heavy oil coming from storage and in the ejector.

Heavy bunker C oil having a low cost of 3 cents per gallon can be used. To produce 1000 c. f. of gas of 1100 B. t. u., about 10 gallons of heavy oil will be required including that used in the form of gas for operating the radiant heat burner, bringing the cost of fuel per therm of net gas produced to less than 3 cents which is less than half that of the cheapest fuel produced in water gas sets. The investment in the machine is also cheaper. The machine can be used either in place of a gas plant or as auxiliary for peak loads, or standby either alone or together with other gases. It is obvious that the process has a great potential market in the gas plants of cities and towns, in industry and for large institutions remote from municipal gas plants.

The invention is not restricted to the details of construction of the apparatus.

In the claims, the name "heating gas" is given to the general type of gas having a low content of illuminants as compared with the total fuel content thereof.

I claim the following as my invention:

1. The process of producing heating gas from liquid high B. t. u. content oil and water which comprises preheating the water to produce steam, producing a fluid suspension of oil and steam, commingling additional water with said suspension and subjecting the resulting mixture to radiant heat at progressively increasing temperatures while distributed in layers of increasing area and volume to a temperature sufficient in the presence of a catalyst to crack the heavier hydrocarbons and dissociate the water and form thereof a succession of permanent gases in large volume having a comparatively low content of heat producing constituents per cubic foot.

2. In a process of producing heating gas from liquid high B. t. u. content oil and water, the step of producing a fluid suspension of oil and water and subjecting it to radiant heat at progressively increasing temperatures while expanding in thin bodies of increasing surface area and volume to a temperature sufficient in the presence of a catalyst to crack the heavier hydrocarbons and dissociate the water and in large part form thereof a succession of permanent gases in large volume having a predetermined range of heat producing constituents per cubic foot.

3. The utilization in a procedure as described in claim 2 of a nickel type catalyst to assist radiant heat predominantly in the later stages for obtaining the desired ultimate composition of the product.

4. A process of producing heating gas from liquid hydrocarbons and water which comprises forming a fluid suspension thereof, subjecting said suspension to radiant heat in a series of stages the last of which is in the presence of a catalyst wherein the volume and temperature of said mixture are caused to increase to the point of cracking said hydrocarbons and dissociating said water to combine a portion thereof into permanent gases.

5. In a process as described in claim 4, commingling the water and suspension in the presence of contact materials to prepare the mixture for rapid conversion by radiant heat applied in increasing amounts as gasification proceeds.

6. In a process as described in claim 4, supplementing radiant heat in the initial stages by heat of convection of gaseous products of combustion from which said radiant heat was obtained.

7. A process of producing heating gas from liquid high B. t. u. content oil and water by radiant heat and heat of convection which comprises vaporizing enough water to preheat and form a mist of the oil, subjecting the resulting suspension to combined heat of convection and radiant heat to vaporize it and increasing the exposure to radiant heat in the presence of a catalyst until the volume and heating value of the gas produced is within the desired predetermined range.

8. In a process as described in claim 7 wherein the radiant heat is obtained by combustion of fuel, the utilization of the waste heat in the gaseous products of said combustion to vaporize the water and preheat the oil.

9. Apparatus for producing heating gas from high B. t. u. content oil and water comprising a combined vaporizer and preheater, a furnace chamber enclosing a gas generator, and a condenser, arranged in series with connecting pipes and control means, said generator having a vertically disposed cylindrical shell with a center flue for products of combustion, said flue enclosing an inlet tube and being surrounded by a series of not less than four concentrically disposed tubular baffles of increasing diameter spaced at alternate top and bottom ends from the closed top and bottom of said shell to provide a series of tubular spaces in communication at alternate ends forming a continuous passage from the inner to the outer tubular space of said series, in combination with a circular series of radiant heat burners surrounding said shell in said furnace chamber.

10. Apparatus for producing heating gas from high B. t. u. content oil and water comprising a combined vaporizer and preheater, a furnace chamber enclosing a gas generator, and a condenser, arranged in series with connecting pipes and control means, said generator having a vertically disposed cylindrical shell with a center inlet from the vaporizer and peripheral outlet to the condenser for the heating gas constituents, said inlet being surrounded by a series of not less than four concentrically disposed tubular baffles of increasing diameter spaced at alternate top and bottom ends from the closed top and bottom of said shell to provide a series of tubular spaces in communication at alternate ends forming a continuous passage from the inner to the outer tubular space of said series, in combination with a circular series of radiant heat burners surrounding said shell in said furnace chamber.

11. In apparatus for producing heating gas comprising a gas generator arranged in a furnace, said generator being of cylindrical shape and consisting of not less than four concentrically disposed tubular baffles of increasing diameter providing a series of annular spaces between them, openings at alternate ends of said generator connecting adjacent spaces to permit passage of heating gas constituents from space to space and end to end of said generator, and a circular series of radiant heaters surrounding said generator on all sides in said furnace.

12. In apparatus of the character described in claim 10, additional radiant heaters positioned beneath said generator whereby said baffles can be heated periodically to a temperature in excess of 1400° F. in the presence of steam to free said tubes from deposited carbon.

13. A system of generating heating gas from liquid hydrocarbons and water comprising a closed vessel for preheating a portion of said constituents, means for commingling said constituents, a mixing vessel containing eddy-forming means for preparing said constituents for gasification, a gas generator comprising not less than four concentrically disposed tubular baffles forming heating chambers, means for admitting said constituents at the center and withdrawing them at the outer periphery of said heating chambers, and radiant heaters surrounding said gas generator, in combination with control means for maintaining an increasing temperature in said chambers from the center outwards.

14. A system for generating heating gas from heavy liquid fuel and water comprising a furnace having a container with at least four concentric sections, means for preheating and finely dividing and mixing the fuel with a portion of the water, a second water supply means for mixing additional water therewith as it enters said container, means encompassing said container for subjecting the fuel and water mixture to heat in successive stages at temperatures increasing from about 800° F. to about 1600° F. while permitting controlled expansion thereof at uniform pressure, and means for withdrawing gas generated at successive stages of its production.

15. A heating gas plant comprising a water and oil vaporizer and a fixed gas generator utilizing radiant heat produced in gas burners wherein the products of combustion of the radiant heat burners are utilized in the vaporizer, in combination with a combined gas condenser and water preheater, thereby enabling a cyclical heat system to be maintained, characterized by the arrangement of said gas burners, in a circle surrounding said gas generator and facing inwards to project infra-red rays towards the center thereof whereby the outer portion of said generator may be maintained at a steam dissociating temperature of over 1200° F. and the inner portion at a heavy oil cracking temperature of under 1000° F. and not less than four concentrically disposed baffle walls for causing water and oil mixture to circulate from the center outwardly in said generator under the pressure produced in said vaporizer.

16. In a heating gas plant of the character described in claim 15, a catalytic material in the high temperature portion of said generator for increasing the production of light gases from said water and oil.

17. The method of decarbonization of apparatus of the character described in claim 11 by steaming combined with high temperatures produced by increasing the heat input in the radiant heat burners during decarbonization only and maintaining such decarbonization and steaming at a temperature above 1400° F. in the carbon containing tubes until objectionable carbon deposits are removed.

18. Apparatus for producing heating gas from hydrocarbon containing liquid fuel and water comprising a generator, means for pre-heating and commingling fuel and water, a mixing vessel provided with eddy-forming means for feeding said commingled fuel and water to said generator, a furnace enclosing said generator, said furnace comprising radiant heat emitting burners encircling said generator and uniformly spaced with respect thereto, and said generator having not less than four internal concentric baffle walls forming a plurality of communicating passages symmetrically disposed with respect to each other and to said burners, said passages increasing in capacity from the center inlet to the peripheral outlet thereof and containing catalytic material in the region of larger capacity, and means for controlling the supply of heat from said burners to produce a uniformly increasing temperature in said passages from the center outwards ranging up to not less than about 1400° F.

19. Apparatus for producing gas as described in claim 18 provided with means for removing gaseous products from the communicating passages of the generator at different stages of treatment.

20. A system for generating heating gas from heavy liquid fuel and water comprising unitary means for preheating and finely dividing and mixing the fuel with a portion of the water, including a series of chambers, means for mixing additional water therewith and forming a finely divided suspension of oil in water vapor, means including a series of at least four concentric chambers for subjecting the fuel and water mixture to heat at temperatures increasing from about 800° F. to about 1600° F. while permitting controlled expansion thereof, independent means for controlling the temperature of said suspension at successive stages of treatment, and individual means for removing portions of the gas generated at successive stages of its production.

21. Apparatus for generating heating gas from heavy liquid fuel and water comprising a furnace having a container consisting of at least four sections disposed one within another, means for preheating and finely dividing and mixing the fuel with a portion of the water, means connected between said mixing means and said container for mixing additional water with said fuel and water mixture, heating means in said furnace for subjecting the fuel and water mixture to controlled radiant heat in successive stages at temperatures increasing progressively from about 800° F. to about 1600° F. while permitting expansion thereof at uniform pressure, and means for withdrawing gas from said sections at successive stages of its production.

VIRGIL STARK.

REFERENCES CITED

The following references are of record in the file of this patent:

UNITED STATES PATENTS

| Number | Name | Date |
|---|---|---|
| 268,863 | Browne | Dec. 12, 1882 |
| 440,004 | Burgess | Nov. 4, 1890 |
| 1,154,869 | McHenry | Sept. 28, 1915 |
| 1,967,669 | Hickey | July 24, 1934 |